Patented Aug. 19, 1952

2,607,793

UNITED STATES PATENT OFFICE 2,607,793

ORGANO SILICON AMIDES

Leo Harry Sommer, State College, Pa., assignor to Dow Corning Corporation, Midland, Mich., a corporation of Michigan No Drawing. Application May 24, 1951, Serial No. 228,122

3 Claims. (Cl. 260—448.2)

This invention relates to organosilicon amides and the methods for preparing them.

It is an object of this invention to prepare new compositions of matter which incorporate the properties of both siloxanes and polyamide resins. These materials are useful for coating compositions.

This invention relates to a composition of matter having the formula

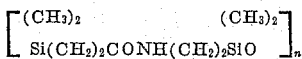

wherein $n$ has an average value of at least 2.

The above compounds are prepared from substituted triorganosilylamide of the formula

where R is phenyl or methyl, by the method which comprises interacting the amide with concentrated sulfuric acid whereby the R group is cleaved from each of the silicon atoms to form a silyl sulfate ester (—SiOSO₃H) and RH. This ester is then hydrolyzed to give a siloxane.

The above amide may be prepared by reacting an acyl chloride of the formula

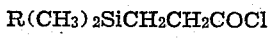

with B-triorganosilyl ethyl amine of the formula

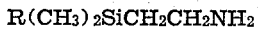

The reaction may be carried out by mixing the above reagents in a solvent, washing the product free of acid and purifying it by distillation.

The latter two compounds shown above are disclosed and claimed in the applicant's copending applications Serial No. 155,782, filed April 13, 1950, and Serial No. 155,783, filed April 13, 1950, now Patent No. 2,557,802, respectively, both assigned to the assignee of this invention.

The following examples are illustrative only and are not to be construed as limiting the invention which is properly set forth in the claims.

Example 1

250 cc. of anhydrous benzene and 73 grams of betatrimethylsilylethylamine were placed in a closed system equipped with a soda-lime tube. An atmosphere of nitrogen was maintained in the system as 51.3 grams of betatrimethylsilylpropionyl chloride was added dropwise. A white precipitate appeared instantly as each drop was added. The addition was complete in one hour. Approximately 30 cc. more of benzene was used to wash down the dropping funnel. Stirring was continued at room temperature for another 3 hours. The reaction mixture was poured into 400 ccs. of water and the benzene layer separated. The aqueous layer was extracted with three 50 cc. portions of benzene and the combined benzene extracts were washed with two 100 cc. portions of 1 N HCl. The benzene layer was then washed with water until neutral. The benzene was removed and the product was distilled to give a pale yellow oil of medium viscosity which boiled 132° to 132.5° C. at 2 mm. This represents a 93 per cent yield of the product N-(beta-trimethylsilylethyl)-beta-trimethylsilylpropionamide.

10 parts by weight of this compound was treated with 9 parts of concentrated sulfuric acid and allowed to stand at room temperature. Gaseous evolution began to take place within a few minutes and continued for about one-half hour. The flask was then heated on a steam bath for one hour longer. The reaction mixture was then added slowly to a solution of potassium hydroxide in absolute alcohol. The amount of hydroxide employed was sufficient to neutralize the sulfuric acid and the mixture was allowed to stand over night. The mixture was filtered and the alcohol was removed and the remaining viscous liquid was made slightly acid with HCl. Upon standing, the liquid became more and more viscous.

This material was a polymer of the formula

The material was then divided into two parts; one portion was heated at 150° C. for 3 hours and at 250° C. for another 3 hours. The liquid polymerized to a clear, tough resin which was rubbery to the touch and could be pulled out to a thin film.

The other portion of the material was heated at .5 mm. pressure at 203° C. for 8 hours. The resulting product was a clear brown resin.

Example 2

The above results are obtained when the starting material for the process of Example 1 is a compound of the formula C₆H₅(CH₃)₂SiCH₂CH₂CONHCH₂CH₂Si(CH₃)₂C₆H₅

That which is claimed is:

1. A method of preparing a polymeric siloxane of the formula

where $n$ has an average value of at least 2, which comprises reacting a compound of the formula R(CH₃)₂SiCH₂CH₂CONHCH₂CH₂Si(CH₃)₂R with concentrated sulfuric acid and thereafter hydrolyzing the material, in the above compound R being selected from the group consisting of methyl and phenyl radicals.

2. 

where $n$ has an average value of at least 2.

3. 

where R is selected from the group consisting of methyl and phenyl radicals.

LEO HARRY SOMMER.

No references cited.